Dec. 20, 1960 R. W. DOCHTERMAN Re. 24,909

SUBMERSIBLE PUMP-MOTOR

Original Filed Oct. 29, 1954 2 Sheets-Sheet 1

Inventor:
Richard W. Dochterman,
by John M. Stoudt
Attorney.

Dec. 20, 1960 R. W. DOCHTERMAN Re. 24,909

SUBMERSIBLE PUMP-MOTOR

Original Filed Oct. 29, 1954 2 Sheets-Sheet 2

Inventor:
Richard W. Dochterman, by John M. Stoudt
Attorney.

United States Patent Office

Re. 24,909
Reissued Dec. 20, 1960

24,909

SUBMERSIBLE PUMP-MOTOR

Richard W. Dochterman, Fort Wayne, Ind., assignor to General Electric Company, a corporation of New York Original No. 2,782,720, dated Feb. 26, 1957, Ser. No. 465,551, Oct. 29, 1954. Application for reissue May 2, 1960, Ser. No. 26,389

15 Claims. (Cl. 103—87)

Matter enclosed in heavy brackets [ ] appears in the original patent but forms no part of this reissue specification; matter printed in italics indicates the additions made by reissue.

This invention relates to pump-motor assemblies, and more particularly to those pump-motor assemblies which are adapted to be immersed in the fluid to be pumped.

There are a variety of pumping applications where it is preferable from an economical point of view to build the pump and the motor as a unit. In such instances it will be apparent that it is generally necessary to immerse the motor in the fluid to be pumped, which in many cases may be injurious to the motor parts because of corrosion, short-circuiting, etc. Many efforts have been made to solve the problem of protecting the motor from the fluid in which it is immersed, most of the solutions being based on the idea of encasing the motor parts so that they were entirely isolated from the fluid; while many of the solutions have been relatively successful, it was, of course, always necessary to provide an effective seal between the motor and the pump so that the fluid would not leak in through the relatively moving parts, thereby considerably increasing the cost of production. It will be seen that it is desirable to eliminate the expense attendant upon the effective insulation of the movable motor parts from the pump. It is proposed in the subject invention that this expense be eliminated by deliberately leaving the movable parts of the motor open to the fluid, and enclosing only the stationary motor parts, which are generally the more sensitive insofar as corrosion and short-circuiting is concerned. Such a structure permits a low cost pump-motor assembly which is simple to manufacture and which, by the omission of any seal, removes the difficulties occasioned by leaks therein.

It is an object of this invention to provide a pump-motor assembly which will incorporate the improved features set forth above.

Further objects and advantages of this invention will become apparent and the invention will be better understood by reference to the following description and the accompanying drawings, and the features of novelty which characterize this invention will be pointed out with particularity in the claims annexed to and forming a part of this specification.

This invention, in its broadest aspects, provides a pump-motor assembly wherein a housing of insulating material has a bore formed therein. A stator member is entirely encased within the insulating material of the housing and is so positioned that it surrounds the bore in relatively close proximity thereto. A rotor member is rotatably supported within the bore, and a pump impeller may be secured to the rotor so as to be rotatable therewith. The entire assembly may be immersed in a fluid, generally a liquid, and when electric power is supplied to the stator member, the rotor member will be caused to rotate whereupon the pump impeller will pump the fluid as desired.

Figure 1:
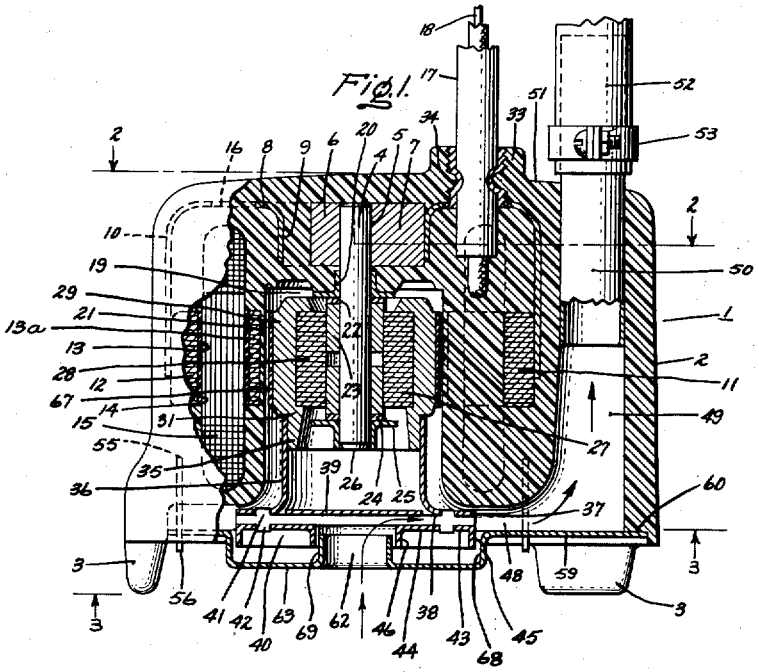
Figure 1 is a side view, partly broken away and partly in cross section, of the improved pump-motor assembly of this invention.

Referring now to the figures of the drawing, and in particular Figure 1, there is shown an improved pump-motor assembly generally indicated by the numeral 1. The assembly is substantially enclosed by a housing 2, which is preferably formed of a stable insulating material having a low rate of fluid absorption. One such group of materials, for instance, includes the epoxy resins which incorporate the features set forth above and, in addition, provide a high degree of toughness for protective purposes. Housing 2 may be formed with a plurality of supporting members, such as 3, on which it will stand when in operation.

Before the housing is formed, preferably by casting or molding, the stationary parts of the motor are assembled, as will be explained below. A stationary shaft 4 is tightly fitted, as by press-fitting, into the central opening 5 of a spider member 6 which has a plurality of equispaced arms 7 extending radially outward. An annular member 8, preferably formed of some suitable metal, such as steel, is provided with a circular inner flange 9 and a similar, but longer, concentric outer flange 10. The assembly of shaft 4 and spider member 6 is tightly fitted within the inner flange 9 of member 8, and a dynamoelectric machine stator member 11, conventionally made up of thin laminations 12 of magnetic material, is tightly fitted into outer flange 10 of member 8. [Stator member 11 is provided with a plurality of inwardly open*ing*] *The illustrated stator member 11 is of the salient pole type having a pair of diametrically opposed pole pieces 13a which define a plurality of winding* slots, such as 13, each of the slots preferably being provided with a sheet of insulating material 14 covering its inner surface so as to separate laminations 12 from the stator coil 15 which is wound in slots 13.

Figure 2:
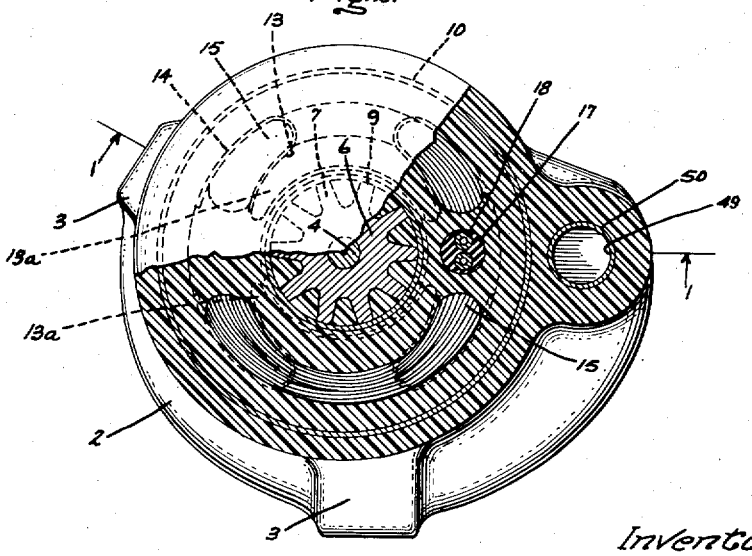
Figure 2 is a view along lines 2—2 of Figure 1.

It will be seen from Figure 2 that two coils 15 are provided. It will be understood, however, that the number of coils used is dependent only upon the particular type of dynamoelectric machines utilized, and that this number may be varied without any effect whatsoever as to the improved structure constituting the invention.

It will be seen from the foregoing that the tight fitting of spider 6 into inner flange 9 and of stator member 11 into concentric outer flange 10 will provide a stator member which is maintained in exact concentricity with stationary shaft 4. Member 8 is provided with a plurality of openings 16; a cable 17 containing a pair of conductors 18 is passed through one of these openings to connection with the coils 15, the remainder of openings 16 being used for a purpose to be explained herebelow. Housing 2 may then be formed, for instance, by placing the assembly of the stator member 11, spider 6, and shaft 4 within a mold and pouring in the housing material. The mold (not shown) will preferably be of a shape to provide the outer conformation of the housing 2 without further effort being necessary. The insulating material will flow through the openings 16 and will completely encase stator member 11 and coils 15. The mold is so formed as to leave an opening 19 within the housing, and an eyelet member 20 is tightly fitted over shaft 4, as shown, to determine the entrance of insulation material to this cavity. Once the molding operation is complete, stator member 12 will be completely encased in the housing 2 with a thin coat 21 of insulation covering the inner surface of the stator. In the case of relatively small motors, coating 21 is preferably on the order of .01 inch at its narrowest part. This is sufficient to insure protection of the inner surface of the stator and is small enough to avoid an unduly large air gap when the rotor (to be described herebelow) is assembled within the stator.

It is deemed preferable, where the housing is cast or molded, to provide a mold of such a shape that cavity 19 will be somewhat smaller than shown in Figure 1 and then to attach a tool to stationary shaft 4 and ream out cavity 19 to the desired size. This avoids the necessity of achieving the thin coating 21 in the mold, since coating 21 may be made relatively thick and then reamed down to the desired size. The fact that the tool (not shown) will be mounted on shaft 4 will insure perfect concentricity since, as explained above, shaft 4 is entirely concentric with stator member 11.

Once the structure is completed to the extent set forth above, a washer member 22 is secured against eyelet member 20 and a bearing member 23 is secured over shaft 4, in rotatable relation thereto, by the addition of a second washer 24 and a second eyelet member 25 at end 26 of shaft 4. A rotor member 27, generally formed of thin laminations of magnetic material, such as 28, is secured to bearing 23 so as to be rotatable therewith. Rotor 27 has a plurality of slots (not shown) through which pass bars 29 of non-magnetic conductive material. Bars 29 are shorted together at their ends by rings 30 and 31, thereby to form a squirrel-cage rotor. It will thus be seen that the electric motor used in the illustration of the invention is a two-pole induction motor. It will, of course, be understood that other types of motors may be successfully used, and that this particular type has been set forth in complete detail for purposes of illustration. The outer surface of rotor 27 is preferably covered with a thin coat 32 of insulation which may be, for example, either sprayed on, dipped, or brushed on. The assembly of the motor parts of the pump-motor unit is then complete. Rotor 27 is concentrically mounted on shaft 4 within stator member 11 which is entirely encased within housing 2.

An additional feature which may be added, if desired, to further insure the protection of stator member 11, is a knurled substantially tubular member 33 which is placed about cable 17 before the casting process. The material of housing 2 will adhere firmly to member 33 which, in turn, has a pinched-in section 34 to cause it to maintain cable 17 securely in place. This provision affords a connection which is secured in place and which will not provide an opening for the fluid to be pumped to enter within the housing to the detriment of the stator member 11.

It will be observed that end ring 31 of rotor 27 is extended away from the rotor, as at 35, and a member 36 is tightly fitted over extension 35 so as to be rotatable with rotor 27. Member 36 has an outwardly extending peripheral flange 37 with a plurality of openings 38 formed therein. A circular piece 39 of sheet metal has a plurality of impeller blades 40 punched out of it. Impeller blades 40 are each formed with a pair of tabs 41 and 42 extending respectively from each side. Tab 41 fits within opening 38 in flange 37 to position the impeller plate 39 with respect to member 36. Each tab 42 fits into an opening 43 formed in a member 44 to position member 44 with respect to impeller member 39. It will be seen that by means of the foregoing an impeller assembly is formed consisting of the three parts 36, 39, and 44. Member 44 is preferably formed with a U-shaped cross section, that is, having an outer circular flange 45 and an inner circular flange 46. In forming impeller blades 40 out of plate 39, a preferred method is to use a plate having the same original diameter as members 36 and 44; the impeller blades 40 are stamped out and bent over as shown, and the remaining material between the inner edge of the impeller blades and the original outer diameter of plate 39 is punched out and removed.

It will be seen from the foregoing that there has been provided a complete impeller unit integrally secured to rotor 27 so as to be rotatable therewith.

Figure 3:
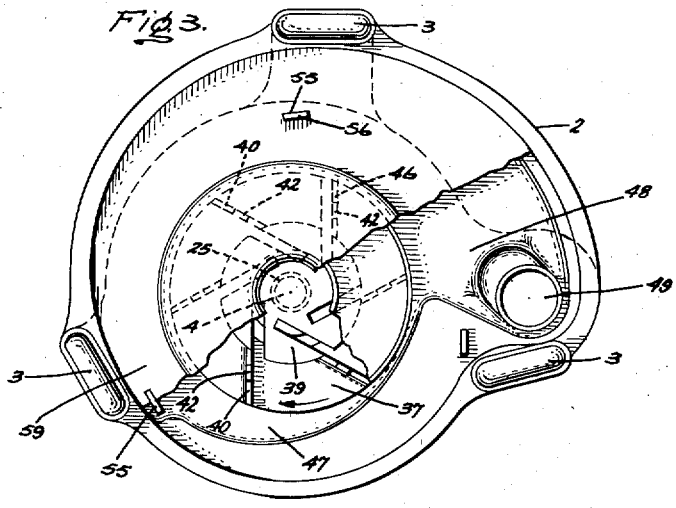
Figure 3 is a view along lines 3—3 of Figure 1.
Figure 4:
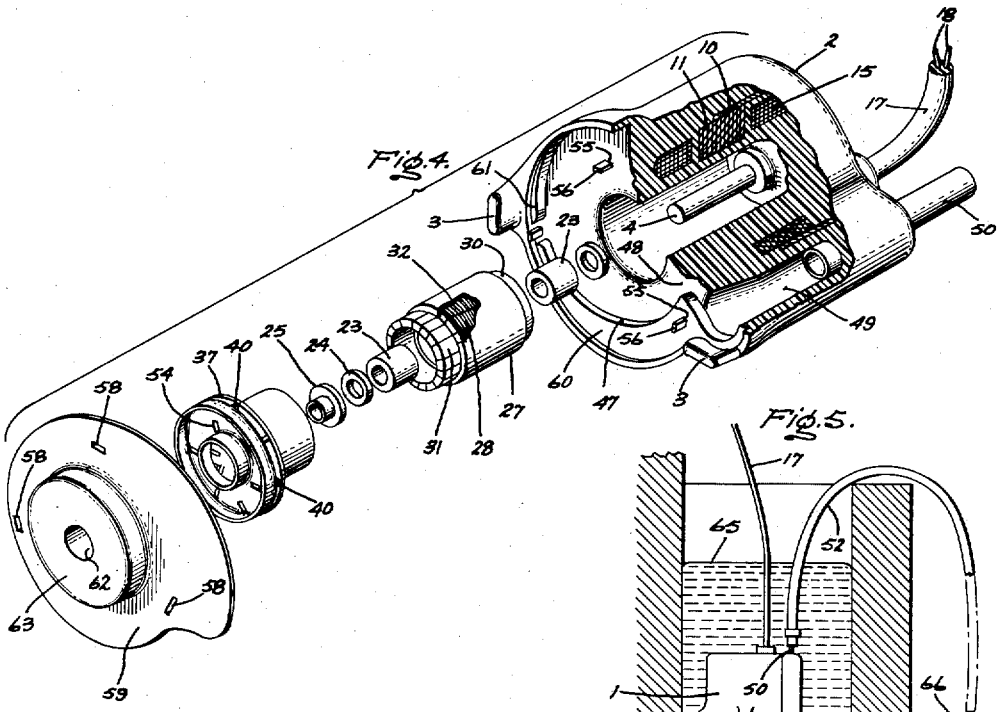
Figure 4 is an exploded view in perspective, partly broken away and partly in cross section, of the improved assembly of this invention.

The bottom of housing 2 has a volute recess 47 formed therein; recess 47 forms the pump chamber, as is best seen in Figures 3 and 4, and terminates in an access 48 which leads to a passageway 49, which is preferably formed in the die mold during the casting of housing 2. A pipe 50 is placed in connection with passageway 49 so as to extend it all the way from the volute pumping chamber 47 at the bottom of the housing out through top of the housing. It will be seen in Figure 1 that pipe 50 extends far enough above the top 51 of the housing so that a coupling may be effected with a pipe or hose, 52 by any desired means, such as clamp 53.

A plurality of relatively pliable strips of metal 55 are cast into housing 2, when it is formed, with their ends 56 extending into the volute chamber 47. Strips 55 extend respectively through openings 58 in a member 59. Once parts 55 have respectively been fitted through openings 58 of member 59, their ends 56 may be bent over so as to secure member 59 to the remainder of the assembly. Member 59 is seated on parts 60 and 61 formed in housing 2 surrounding volute chamber 47, and it will be seen in Figure 4 that member 59 is so shaped as to correspond substantially with the shape of the bottom of housing 2 so as to cover the bottom of the housing and substantially enclose the pumping chamber 47. Member 59 has an opening 62 located in a protruding portion 63 and formed by a re-entrant annular flange 69 thereof, as is best observed in Figure 1. Portion 63 is also provided with a similar outer annular flange 68. When member 59 is secured in place, opening 62 provides the entranceway to the pumping chamber through impeller blades 40. The protrusion of part 63 provides close-running surfaces between flanges 45 and 46 and flanges 68 and 69 respectively to improve the pumping efficiency.

When electric conductors 18 are connected to a source of power, rotor 27 will be induced to turn and thereby cause the pump impeller assembly to turn with it. Impeller blades 40 will draw in fluid through opening 62 and force the fluid into pump chamber 47. The volute shape which has been given to this chamber tends, as is well-known in the art, to convert velocity into static pressure so that by the time the fluid is forced around to access 48 and passageway 49 a relatively high amount of pressure is available to force the fluid up the pipe. It will be observed at this point that volute chamber 47 and the impeller assembly are almost in contact at 64 (see Figure 3) so that practically all the fluid pumped around in the chamber will tend to go through passageway 49 and pipe 50 rather than through the small clearance 64 to be pumped around again.

Figure 5:
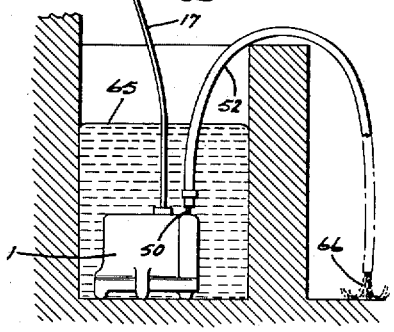
Figure 5 is a side view of the improved assembly in operation.

Referring particularly to Figure 5, there is illustrated one possible use of the improved submersible pump-motor assembly of this invention, wherein the assembly 1 is submerged in a liquid 65, such as water, for instance, and is connected to a source of power through cable 17. Energization of coil 15 of stator member 11 through cable 17 will cause the pump impeller assembly to rotate and force water through pipe 50 and hose 52 to be ejected as shown at 66. It will be observed that no effort has been made to prevent the fluid, such as water, from passing entirely around the rotor and in the air gap, indicated at 67 in Figure 1. Whatever the properties of the fluid, no harm can come to the stator member in view of the fact that it is completely encased within housing 2, even at the air gap where it is covered by the thin coating 21. The part of rotor 27 most vulnerable to corrosion, that is, the outer periphery, has also been coated as shown at 32 so that no matter what fluid circulates within the motor enclosure neither the stator nor the rotor will be harmed thereby. Thus, the assembly may be entirely immersed in the fluid to be pumped without fear of damage to the motor. Further-more, this is achieved without any necessity for sealing the motor cavity from the pumping apparatus, and it is possible to make the assembly more compact and to avoid the expense of additional parts while achieving the desired function in an efficient manner.

While exact structures have been set forth for illustrative purposes as to both the motor component and the pump component of the assembly, it will be understood that the construction of either or both may be varied considerably from that shown while still incorporating the essential features of this invention. Therefore, while the invention has been explained by describing a particular embodiment thereof, it will be apparent that improvements and modifications may be made without departing from the scope of the invention as defined in the appended claims.

What I claim as new and desire to secure by Letters Patent of the United States is:

1. A motor comprising a housing of insulating material having a bore formed therein, said bore being formed to be open at one end of said housing and closed at the other end thereof, a stator member entirely encased within said housing and positioned concentric with said bore and in relatively close proximately thereto, a shaft member secured within said housing and positioned to extend into said bore concentrically with said stator member, means independent of said housing encased therein and joining said stator member and said shaft member to ensure concentricity thereof, an eyelet member rigidly positioned on said shaft member, and a rotor member rotatably supported on said shaft and substantially axially aligned with said stator member, said eyelet member being arranged to determine the axial position of said rotor member on said shaft member.

2. A motor comprising a stator member; a coil positioned on said stator member; an annular member having a circular outer flange, a circular inner flange substantially concentric with said outer flange, and an element connecting said flanges, said stator being tightly secured within said outer flange; a circular spider member having a central opening arranged within said inner flange in tight engagement therewith; a shaft firmly secured within said central opening; an eyelet member rigidly positioned on said shaft adjacent said spider member; a rotor member rotatably secured on said shaft and substantially axially aligned with said stator member, said eyelet being arranged to determine the axial position of said rotor member; said connecting element of said annular member having an opening formed therein, an electric conductor arranged to pass through said opening and to be connected to said coils, said conductor being adapted to be connected to a source of power thereby to cause rotation of said rotor member; a housing composed of insulating non-absorbent material arranged to encase completely said stator member and said coil, said housing having a bore formed therein so as to be open at one end thereof and closed at the other end thereof, said shaft being arranged to extend into said bore from said closed end thereby to position said rotor in said bore.

3. A motor comprising a housing of insulating material having a bore formed therein, said bore being formed to be open at one end of said housing and closed at the other end thereof, a stator member entirely encased within said housing and positioned concentric with said bore and in relatively close proximity thereto, a shaft member secured within said housing and positioned to extend into said bore concentrically with said stator member, means independent of said housing encased therein joining said stator members and said shaft to ensure concentricity thereof, and a rotor member rotatably supported on said shaft member and substantially axially aligned with said stator member.

4. A motor comprising a housing of insulating material having a bore formed therein, said bore being formed to be open at one end of said housing and closed at the other end thereof, a stator member entirely encased within said housing and positioned concentric with said bore and in relatively close proximately thereto, a shaft member secured within said housing and positioned to extend into said bore concentrically with said stator member, metallic means encased in said housing joining said stator member and said shaft to ensure concentricity thereof, and a rotor member rotatably supported on said shaft member and substantially axially aligned with said stator member.

5. A motor comprising a stator member, a coil positioned on said stator member; an annular member having a circular outer flange, a circular inner flange substantially concentric with said outer flange, and an element connecting said flanges; said stator being tightly secured within said outer flange, a circular spider member having a central opening arranged within said inner flange in tight engagement therewith, a shaft firmly secured within said central opening, a rotor member rotatably secured on said shaft and substantially axially aligned with said stator member, said connecting element of said annular member having an opening formed therein, an electric conductor arranged to pass through said opening and to be connected to said coil, said conductor being adapted to be connected to a source of power thereby to cause rotation of said rotor member, and a housing composed of insulating non-absorbent material arranged to encase completely said stator member and said coil, said housing having a bore formed therein so to be open at one end of said housing and closed at the other end thereof, said shaft being arranged to extend into said bore from said closed end thereby to position said rotor in said bore.

6. A motor comprising a stator member, a coil positioned on said stator member; an annular member having a circular outer flange, a circular inner flange substantially concentric with said outer flange, and an element connecting said flanges; said stator being tightly secured within said outer flange, a circular spider member having a central opening arranged within said inner flange in tight engagement therewith, a shaft firmly secured wtihin said central opening, a rotor member rotatably secured on said shaft and substantially axially aligned with said stator member, said connecting element having an opening formed therein, an electric conductor arranged to pass through said opening and to be connected to said coil, said conductor being adapted to be connected to a source of power thereby to cause rotation of said rotor member; and a cast housing composed of an epoxy resin arranged to encase completely said stator member, said coil, said annular member, said spider, and at least a portion of said electric conductor; said housing having a bore formed therein so as to be open at one end of said housing and closed at the other end thereof, said shaft being arranged to extend into said bore from said closed end thereby to position said rotor in said bore.

7. A pump-motor assembly comprising a housing of insulating material having a bore formed therein, said bore being formed to be open at one end of said housing and closed at the other end thereof, a stator member entirely encased within said housing and positioned encircling said bore and in relatively close proximity thereto, a rotor member rotatably supported within said bore, a pump impeller secured to said rotor so as to be rotatable therewith and being adapted to be immersed in a fluid and to pump the same when rotated, the end of said housing adjacent the open end of said bore being formed into a volute recess, and means for covering said recess thereby to form a pump chamber, said impeller being positioned substantially centrally in said recess thereby to pump fluid therethrough, said housing so having a passageway formed therein as to communicate with said recess and adapted to receive the pumped fluid.

8. A pump-motor assembly comprising a housing of insulating material having a bore formed therein, said bore being formed to be open at one end of said housing and closed at the other end thereof, a stator member entirely encased within said housing and positioned encircling said bore and in relatively close proximity thereto, a rotor member rotatably supported within said bore, a shaft arranged to extend into said bore from said closed end, said rotor being rotatably mounted on said shaft thereby to position said rotor in said bore, a pump impeller secured to said rotor so as to be rotatable therewith, the end of said housing adjacent the open end of said bore being formed into a volute recess, a member arranged to be secured to said housing and to cover said recess thereby to form a pump chamber, said impeller being positioned substantially centrally in said recess, said member covering said recess having a substantially centrally located opening therein, said housing having a passageway formed therein so as to communicate with said recess whereby upon rotation of said rotor member said impeller is adapted to draw fluid through said centrally located opening and pump the same through said chamber into said passageway.

9. A pump-motor assembly comprising a housing of insulating material having a bore formed therein, said bore being formed to be open at one end of said housing and closed at the other end thereof, a stator member entirely encased within said housing and positioned encircling said bore and in relatively close proximity thereto, a rotor member rotatably supported within said bore, a pump impeller secured to said rotor so as to be rotatable therewith, a pump chamber formed at the end of said housing around said impeller, said housing having a passageway formed therein in communication with the outlet part of said chamber, and an inlet passageway arranged in communication with said impeller whereby when said assembly is submerged in a fluid and said rotor member is caused to rotate said impeller is adapted to draw fluid through said inlet and pump the same through said chamber into said formed passageway.

10. A pump-motor assembly comprising a housing of insulating material having a bore formed therein, said bore being formed to be open at one end of said housing and closed at the other end thereof, a stator member entirely encased within said housing and positioned encircling said bore and in relatively close proximity thereto, a rotor member rotatably supported within said bore, said rotor having an end ring formed at the end thereof toward the open end of said bore, and a pump impeller rotatably positioned in the open end of said bore, said impeller comprising a plurality of impeller blades and an annular member secured thereto, said annular member having an inner circular flange extending around and in tight engagement with said end ring, said housing having a volute pump chamber formed at the open end of said bore about said impeller, a member arranged substantially to close said chamber, means extending from said housing to secure said chamber-closing member thereto, said chamber-closing member having an opening formed therein to provide an inlet to said impeller, said housing having an outlet passageway formed therein in communication with the outlet portion of said chamber whereby said impeller is adapted to pump liquid in through said inlet and force the same through said chamber and said passageway.

11. A pump-motor assembly comprising a housing of insulating material having a bore formed therein, said bore being formed to be open at one end of said housing and closed at the other end thereof, a stator member entirely encased within said housing and positioned concentric with said bore and in relatively close proximity thereto, a shaft member secured within said housing and positioned to extend into said bore concentrically with sadi stator member, metallic means encased in said housing joining said stator member and said shaft to ensure concentricity thereof, a rotor member rotatably supported on said shaft member and substantially axially aligned with said stator member, and a pump impeller positioned in the open end of said bore and secured to said rotor so as to be rotatable therewith, said impeller being adapted to be immersed in a fluid and to pump the same when rotated, said housing having a pump chamber formed therein around said impeller, said housing also having formed therein a passageway in communication with the outlet part of said chamber, and inlet means arranged in communication with said impeller whereby said impeller is adapted to draw fluid through said inlet means and pump the same through said chamber into said formed passageway upon rotation of said rotor member.

12. A pump-motor assembly comprising a stator member, a coil positioned on said stator member; an annular member having a circular outer flange, a circular inner flange substantially concentric with said outer flange, and an element connecting said flanges; said stator being tightly secured within said outer flange, a circular spider member having a central opening arranged within said inner flange in tight engagement therewith, a shaft firmly secured within said central opening, a rotor member rotatably secured on said shaft and substantially axially aligned with said stator member, said connecting element of said annular member having an opening formed therein, an electric conductor arranged to pass through said opening and to be connected to said coil, said conductor being adapted to be connected to a source of power thereby to cause rotation of said rotor member, a housing composed of an insulating non-absorbent material arranged to encase completely said stator member and said coil, said housing having a bore formed therein to be open at one end of said housing and closed at the other end thereof, said shaft being arranged to extend into said bore from said closed end thereby to position said rotor in said bore, and a pump impeller positioned in the open end of said bore and secured to said rotor so as to be rotatable therewith, said impeller being adapted to be immersed in a fluid and to pump the same when rotated, the end of said housing adjacent the open end of said bore being formed into a volute recess, means for covering said recess thereby to form a pump chamber, said impeller being positioned substantially centrally in said recess thereby to pump fluid therethrough, said housing having a passageway formed therein so as to communicate with said recess and adapted to receive the pump fluid.

13. A pump-motor assembly comprising a stator member, a coil positioned on said stator member; an annular member having a circular outer flange, a circular inner flange substantially concentric with said outer flange, and an element connecting said flanges; said stator being tightly secured within said outer flange, a circular spider member having a central opening arranged within said inner flange in tight engagement therewith, a shaft firmly secured within said central opening, a rotor member rotatably secured on said shaft and substantially axially aligned with said stator member, said connecting element having an opening formed therein, an electric conductor arranged to pass through said opening and to be connected to said coil, said conductor being adapted to be connected to a source of power thereby to cause rotation of said rotor member; a cast housing composed of an epoxy resin arranged to encase completely said stator member, said coil, said annular member, said spider, and at least a portion of said electric conductor; said housing having a bore formed therein so as to be open at one end of said housing and closed at the other end thereof, said shaft being arranged to extend into said bore from said closed end thereby to position said rotor in said bore, said rotor having an end ring formed at the end thereof toward the open end of said bore, and a pump impeller positioned in the open end of said bore, said impeller comprising a plurality of impeller blades and a second annular member secured thereto, said second annular member having an inner circular flange extending around and in tight engagement with said end ring, said housing having a volute pump chamber formed at the open end of said bore about said impeller, a member arranged substantially to close said chamber, means extending from said housing to secure said chamber-closing member thereto, said chamber-closing member having an opening formed therein to provide an inlet to said impeller, said housing having an outlet passageway formed therein in communication with the outlet portion of said chamber whereby said impeller is adapted to pump fluid in through said inlet and force the same through said chamber and said passageway.

14. In a pump-motor assembly, an electric motor comprising a housing of insulating material having a bore formed therein, said bore being formed to be open at one end of said housing and closed at the other end thereof, a stator member entirely encased within said housing and positioned concentric with said bore and in relatively close proximity thereto, a shaft member secured within said housing and positioned to extend into said bore concentrically with said stator member, a spider member secured about said shaft within said housing, an annular member having an outer circular flange in tight engagement with the outer surface of said stator member and an inner circular flange substantially concentric with said outer flange in tight engagement with the outer surface of said spider member thereby to ensure concentricity of said stator member and said shaft member, and a rotor member rotatably supported on said shaft member and substantially axially aligned with said stator member.

15. In a pump-motor assembly, an electric motor comprising a stator member, a coil positioned on said stator member; an annular member having a circular outer flange, a circular inner flange substantially concentric with said outer flange, and an element connecting said flanges; said stator being tightly secured within said outer flange, a circular spider member having a central opening arranged within said inner flange in tight engagement therewith, a shaft firmly secured within said central opening, a rotor member rotatably secured on said shaft and substantially axially aligned with said stator member, said connecting element having an opening formed therein, an electric conductor arranged to pass through said opening and to be connected to a source of power thereby to cause rotation of said rotor member, a housing composed of an insulating non-absorbent material arranged to encase completely said stator member and said coil, said housing having a bore formed therein to be open at one end of said housing and closed at the other end thereof, said shaft being arranged to extend into said bore from said closed end thereby to position said rotor in said bore.

References Cited in the file of this patent or the original patent

UNITED STATES PATENTS

| | | |
|---|---|---|
| 1,921,111 | Apple | Aug. 8, 1933 |
| 2,067,155 | Levy et al. | Jan. 5, 1937 |
| 2,286,993 | Naul | June 16, 1942 |
| 2,318,786 | Korte | May 11, 1943 |
| 2,548,133 | Treat | Apr. 10, 1951 |
| 2,649,048 | Pezzillo | Aug. 18, 1953 |
| 2,685,658 | Feiertag | Aug. 3, 1954 |
| 2,695,969 | Yates | Nov. 30, 1954 |